(12) United States Patent
Jhingran

(10) Patent No.: US 9,690,918 B2
(45) Date of Patent: Jun. 27, 2017

(54) BIOMETRIC SOFTKEY SYSTEM

(71) Applicant: Verizon Patent and Licensing Inc., Basking Ridge, NJ (US)

(72) Inventor: Amit Jhingran, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 119 days.

(21) Appl. No.: 14/478,602

(22) Filed: Sep. 5, 2014

(65) Prior Publication Data
US 2016/0072798 A1 Mar. 10, 2016

(51) Int. Cl.
*G06F 7/04* (2006.01)
*G06F 21/32* (2013.01)

(52) U.S. Cl.
CPC .................... *G06F 21/32* (2013.01)

(58) Field of Classification Search
CPC .................. G06F 21/32; G06F 21/606; G06F 2221/2115; H04L 63/0861; H04L 67/06; H04L 63/0815; H04L 63/20; H04W 12/06; H04W 12/08; H04W 4/008; H04W 12/04; H04W 4/001; H04W 88/02; H04W 8/205; H04W 8/22; H04W 4/003; H04W 4/023; H04W 4/16; H04W 4/22; H04W 4/24; H04W 52/0254
USPC ........................................................... 726/5
See application file for complete search history.

(56) References Cited

U.S. PATENT DOCUMENTS

| 8,908,935 B2* | 12/2014 | Ferren ................ G07C 9/00158 382/100 |
| 2007/0191070 A1* | 8/2007 | Rao ........................ G07C 13/00 455/566 |
| 2013/0090939 A1* | 4/2013 | Robinson ................ G06F 21/32 705/2 |

* cited by examiner

*Primary Examiner* — Abiy Getachew

(57) ABSTRACT

A computing system is described in which biometric softkeys control access to and launch computer applications in response to one or a combination of biometric signatures. After having been registered, biometric signatures are received and mapped to applications of the user environment. A particular biometric signature is then used to automatically launch the corresponding application.

20 Claims, 6 Drawing Sheets

Access Map 200

| Registered Biometric Signature | User Environment |
|---|---|
| 202 | 108a |
| 204 | 108b |
| 206 | 108c |
| 208 | 108d |
| 210 | 108e |

Application Map 300

| Registered Biometric Signature | Application |
|---|---|
| 302 | General |
| 304 | Voice or video call |
| 306 | Voicemail |
| 308 | E-mail |
| 310 | Text Messaging |
| 312 | Maps & Navigation |
| 314 | Camera |
| 316 | Audio Recorder |
| 318 | Document Reader |

FIG. 3

BIOMETRIC SOFTKEY SYSTEM

BACKGROUND

A traditional softkey may include a button (e.g., as part of or displayed by a computing device) that is configured to invoke a number of functions rather than being associated with a single fixed function. In contrast to hard-coded keys printed with a functional icon or text indicating the fixed function to be performed, a softkey may invoke a function that may be set by a user. However, traditional softkeys lack the ability to perform functions based on a biometric signature of user. It may be desirable to utilize biometric softkeys, for example, to control access to and launch computer applications in response to one or a combination of biometric signatures.

BRIEF DESCRIPTION OF THE DRAWINGS

FIG. 3 illustrates an exemplary application map.

DETAILED DESCRIPTION

An exemplary system may comprise a user interface, a biometric input device, a processor, and a memory having a user environment communicatively connected to the processor. The processor may be configured to receive a provided biometric signature from the biometric input device, compare the provided biometric signature with a registered biometric access signature, compare the provided biometric signature with a registered biometric application signature, and launch an application of the user environment in response to the provided biometric signature matching the registered biometric access signature and the registered biometric application signature.

Figure 1:
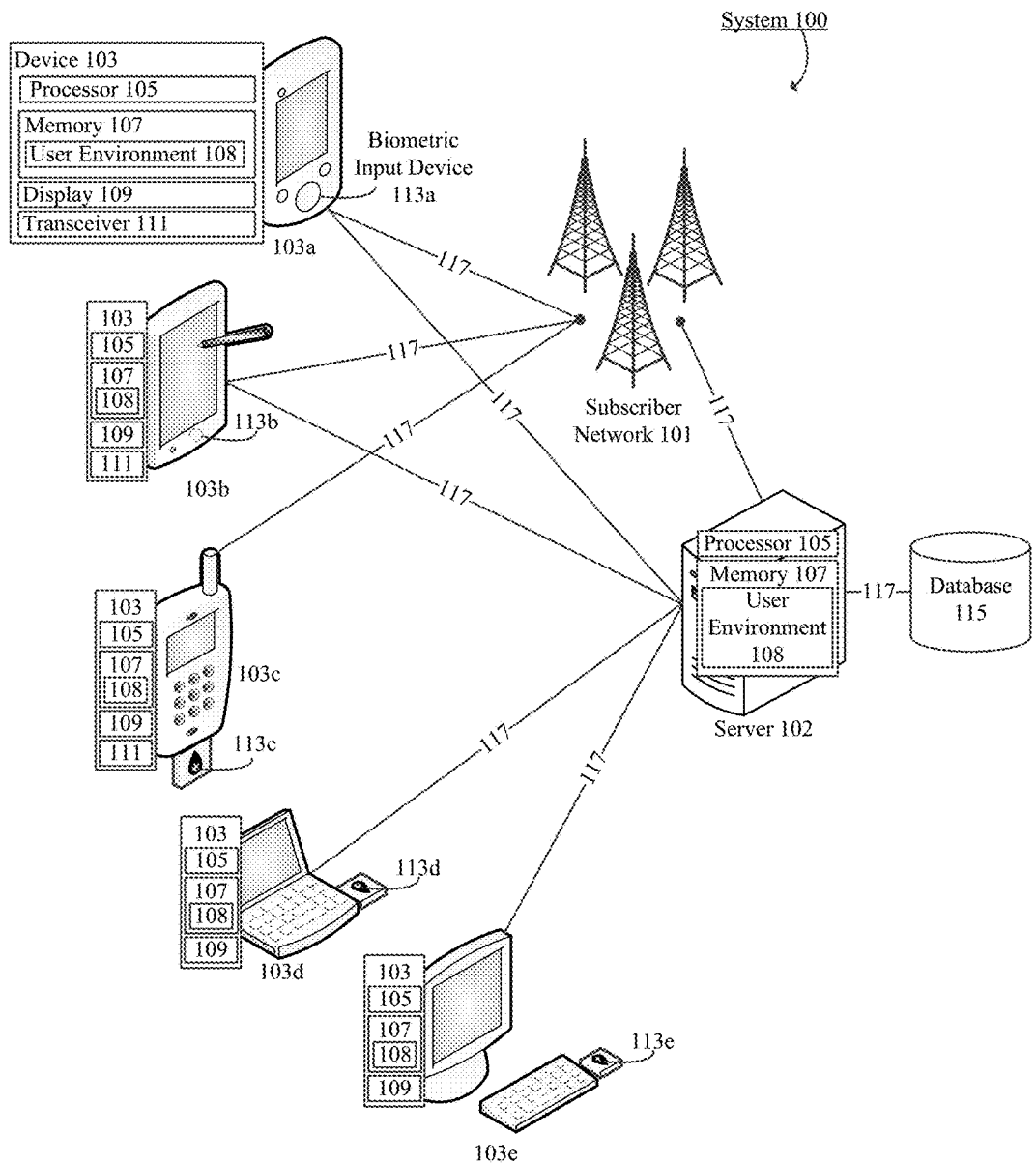
FIG. 1 illustrates an exemplary system of the present disclosure.

FIG. 1 illustrates an exemplary system 100, for example, configured to utilize biometric signatures to control access to and launch applications of a computing device. System 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

As illustrated in FIG. 1, the system 100 may include a subscriber network 101, a server 102, a device 103 (e.g., devices 103a-e), a biometric input device 113 (e.g., biometric input devices 113a-e), a database 115, and connections 117. The server 102 and devices 103a-e may include a processor 105 and a memory 107 with a user environment 108. The devices 103a-e may further include a display 109 and a transceiver 111.

The system 100 may be configured to receive (e.g., using biometric input device 113), transfer (e.g., using connections 117), compare (e.g., using processor 105), and store (e.g., using memory 107 and database 115) biometric signatures with respect to server 102 and devices 103a-e. For instance, the device 103, e.g., a computing device such as a mobile device, may be configured to launch one or more applications of the environment 108 in response to a biometric signature (e.g., a fingerprint) from the biometric input device 113, which may be part of or in communication with the device 103.

The system 100 may include a network that provides the infrastructure through which the server 102, devices 103a-e, biometric input device 113, and database 115 may communicate, for example, to distribute and compare biometric signatures to control access to and the launch of computer applications by devices 103a-e. For instance, the network may be an infrastructure that generally includes edge, distribution, and core devices (e.g., server 102) and enables a path (e.g., connection 117) for the exchange of biometric signatures between different devices and systems (e.g., between server 102, devices 103a-e, biometric input device 113, and database 115). In general, a network (e.g., system 100 or subscriber network 101) may be a collection of computers and other hardware to provide infrastructure to establish connections and carry communications.

The system 100 may utilize a network with any networking technology to provide connections 117 between any of subscriber network 101, server 102, devices 103a-e, biometric input devices 113a-e, and database 115. The connections 117 may be any wired or wireless connections between two or more endpoints (e.g., devices or systems), for example, to facilitate transfer of biometric signatures between any portions of system 100. System 100 may utilize any wired or wireless network. The network may include a packet network or any other network having an infrastructure to carry communications. Exemplary networks may include one or more of a cellular network, telephone network, global area network, wide area networks (WAN), a VoIP network, an LTE network, a VoLTE (Voice over LTE) network, fiber optic network, cable network, television network, local area networks (e.g., Ethernet), wireless local area networks (e.g., radio-frequency (RF) or Wi-Fi), powerline networks, or combinations thereof. The network may further include a direct wired connection, for example, a data cable connecting two or more devices. The system 100 is provided as an example, and thus while a single server 102 is illustrated, system 100 may represent a single network, a combination of different networks components and technologies, and/or a plurality of networks.

Subscriber network 101 may be configured to provide communications services to and between a plurality of devices (e.g., server 102 and devices 103a-e). The subscriber network 101 may provide communications services, such as packet-switched network services (e.g., Internet access, VoIP (Voice over Internet Protocol) communication services) and location services (e.g., device positioning), to devices connected to the subscriber network 101. Exemplary subscriber network 101 may include any network, for example a VoIP network, an LTE network, a VoLTE (Voice over LTE) network, a cellular network, a telephone network, a fiber optic network, a cable network, and a television network, as some non-limiting examples. The devices on the subscriber network 101 may be associated with subscriber information including subscriber identifiers used to uniquely identify the corresponding devices, such as mobile device numbers (MDNs), mobile identification numbers (MINs), mobile telephone numbers (MTN), common language location identifier (CLLI) codes, Internet protocol (IP) addresses, and universal resource identifiers (URIs), as some non-limiting examples.

The server 102 may include any computing system configured to communicatively connect with the devices 103 and database 115. The server 102 may be connected, via connection 117, to the subscriber network 101, devices 103, and database 115. Server 102 may be in continuous or periodic communication with devices 103. Server 102 may include a local, remote, or cloud-based server and may be in communication with devices 113 and receive biometric signatures from the biometric input device 113 of the device 103. The server 102 may further provide a web-based user interface (e.g., an internet portal) to be displayed by any of the display 109 of device 103. The server 102 may communicate the biometric signatures with device 103 using an notification, for example automated phone call, short message service (SMS) or text message, e-mail, http link, web-based portal, or any other type of electronic communication. In addition, the server 102 may be configured to store biometric signatures as part of memory 107 as part of server 102 or database 115 connected to server 102. The server 102 may include a single or a plurality of centrally or geographically distributed servers 102.

The biometric signature may include any physical, visual, audible, or other body characteristic that may be used to uniquely identify a user. An exemplary biometric signature may include a fingerprint (e.g., of a thumb, index finger, middle finger, ring finger, or little finger of a left or right hand), finger or hand gestures, voiceprint (e.g., voice signature and/or commands), facial recognition (e.g., facial features and/or gestures), or any other visual, audible, or other body characteristic of a user. The biometric signature may include a single or a combination of biometric signatures.

The user environment 108 of device 103 may include any user interface configured to be generated by processor 105 and displayed as part of display 109. The user environment 108 may include one or a plurality of user profiles associated with a computer operating system of the device 113. The device 113 may include one or a plurality of user environments 108 with each user environment 108 being associated with a different user or user profile. The environment 108 may be launched using the processor 105 and displayed as part of the display 109. The environment 108 may include one or more applications. The environment 108 may be configured to provide access to the one or more applications and, after access has been provided, launch one or more applications based on the biometric signature.

The biometric input device 113 may include any device configured to receive a biometric signature from a user, provide the biometric signature to processor 105, and store the biometric signature as part of memory 107 (e.g., of the device 103 or server 102) or database 115. One or a set of biometric signatures may be configured to provide access to the user environment 108 of user device 103 (e.g., referred to as a biometric access signature) and/or launch a computer application of the user environment 108 (e.g., referred to as a biometric application signature). For example, a biometric signature may provide access to the user environment 108 and the same biometric signature or any number of additional biometric signatures may each launch one or a set of applications of user environment 108. The biometric input device 113 may include a biometric sensor (e.g., scanner or microphone) that may be configured to receive (e.g., scan or record) a biometric signature of a user of the device 103. The user environment 108 may be configured to store (e.g., as part of memory 107 or database 115) the biometric signatures from the biometric input device 113 and coordinate biometric signatures with server 102, devices 103, and database 115. The user environment 108 may use the biometric signature to provide access to the user environment 108 of the device 103 and launch applications of the user environment 108.

The biometric input device 113 (e.g., using the processor 105) may be configured to provide access to the user environment 108 based on an access map. An exemplary access map may include a table configured to associate one or a set of registered biometric signatures with a user environment 108 associated with one or plurality of users. The access map, stored as part of the memory 107 or database 115, may associate one or a plurality of registered biometric signatures to one or a plurality of user environments 108. For example, each registered biometric signature may correspond to at least one of the plurality of the user environments 108. The biometric input device 113 may receive a biometric signature and provide access to the user environment 108 of device 103 using the biometric signature. Thus, one or a set of registered biometric signatures may be stored as part of the access map configured to map a set of biometric signatures to one or a set of users, as discussed in further detail below.

The biometric signature may be received by the biometric input device 113 (e.g., as part of or connected to device 103) and may be stored as part of memory 107 (e.g., of the server 102 or device 103) or database 115. The provided biometric signature may be compared or matched to a registered biometric signature, which has been previously registered as part of server 102 or database 115. In response to the provided biometric signature matching the registered biometric signature, the user environment 108 may authorize access to the device 103. For example, the biometric input device 113 (e.g., as part of or connected to the device 103) may receive a provided biometric signature, store the provided biometric signature as part of the memory 107 of the device 103, and, using the processor 105 of the device 103, compare the provided biometric signature with a registered biometric signature as part of the memory 107 (e.g., of server 102) or database 115. Alternatively, the biometric input device 113 (e.g., as part of or connected to the device 103) may receive a provided biometric signature, transfer the provided biometric signature to the server 102, store the biometric signature as part of memory 107 of the server 102 or database 115, and, using the processor 105 of the server 102, compare the provided biometric signature with a registered biometric signature as part of the memory 107 (e.g., of server 102) or database 115. Thus, the biometric signatures may be used to selectively provide access to the user environment 108 of the device 103.

For fingerprints, the biometric input device 113 may include a fingerprint scanner having a number of control surfaces configured to optically acquire a fingerprint image when a finger touches and/or presses one or more of the control surfaces. The biometric input device 113 may include an image sensor configured to acquire the fingerprint image. The biometric input device 113 (e.g., using the processor 105) may be configured to analyze the fingerprint image acquired by the image sensor to determine whether the fingerprint image is acceptable for further processing. The processor 105 may evaluate the fingerprint image based on a quality threshold (e.g., average pixel darkness, minimum resolution, or minimum image detail) and accept or reject the fingerprint image based on the quality threshold. For example, the processor 105 may evaluate the average pixel darkness and reject the received fingerprint image if the image is too dark or light. If the fingerprint is rejected, the processor 105 may cause the biometric input device 113 to adjust settings of the fingerprint scanner, display a "try again" message as part of the display 109, and reacquire the fingerprint image. If the fingerprint is accepted, the biometric input device 113 may transmit the provided fingerprint image to the processor 105 (e.g., of the device 103 or server 102), which may compare the provided fingerprint image to a registered fingerprint image as part of the memory 107 (e.g., of the server 102) or database 115, as described above.

The biometric input device 113 may be configured to launch an application of the environment 113 based on an application map. An exemplary application map may include a table, stored as part of the memory 107 or database 115, configured to associate one or a set of registered biometric signatures with one or a set of applications of the environment 113. For example, the application map may be associated one or a set of registered biometric signatures with one or a set of applications of the environment 113. The biometric input device 113 (e.g., using user environment 108) may be configured as a softkey, for example, to launch an application of the user environment 108, e.g., using the processor 105, in response to receiving a registered biometric signature. One or a set of registered biometric signatures may be stored as part of the application map. Thus, the application map may be configured to associate one or a set of biometric signatures with one or a set of applications of the user environment 108, as discussed in further detail below.

After access is provided to the user environment 108, the user environment 108, e.g., generated using the processor 105 and displayed as part of the display 109, may invoke a biometric softkey application configured to present one or more applications to be launched. The biometric softkey application may include instructions that may be loaded to the memory 107 and executed by the processor 105 to present, e.g., as part of the display 109, a plurality of sections associated with one or more of applications of the user environment 108. Each section may correspond to at least one application of the user environment 108. The plurality of sections may be presented, e.g., using the display 109, as a pop-up menu of applications of user environment 108 with each section of the pop-up menu being mapped to a particular application according to the application map, which may be set or customized by a user. After application is provided to the user environment 108, the application may be launched while softkey application is active. The display 109 may receive a registered biometric signature anywhere on the display 109, which may cause the processor 105 to launch an application associated with the selected section of the display. Thus, an application may be selected by the registered biometric signature and launched based on the selected section of the display 109.

The applications of user environment 108 may include one or more native applications (e.g., locally installed as part of the memory 107 of device 103), web applications (e.g., not installed locally but available through an internet browser), or hybrid applications (e.g., at least in part installed locally and available through an internet browser). The applications of user environment 108 may include a general (e.g., operating system tools, calculator, and internet browser), voice or video call, voicemail, e-mail, text messaging, maps, navigation, camera, audio recorder, document reader, finance, music, game, fitness, weather, news, or any other computer application. Thus, in response to receiving a biometric signature, the user environment 108 may launch an application associated with the biometric signature.

For data security, the biometric signatures may be encrypted and unencrypted using secure key classes. For example, a key may be included in a text field in a file record as part of the biometric signature or as part of memory 107 or database 115. Using an encryption-decryption algorithm, the key may be encrypted (e.g., by processor 105) for transmission of the biometric signatures and decrypted (e.g., by processor 105) for the receipt of biometric signatures. Upon decryption of the biometric signature, the biometric signature may be utilized to access and/or launch applications of the user environment 108 of the device 103. As the biometric signatures pass through system 100, the biometric signatures may be decrypted and unencrypted with an algorithm using the secure key classes. An exemplary encryption-decryption algorithm may include an RSA algorithm that may use a product of prime numbers along with an auxiliary value as a public RSA key to encrypt the biometric signatures (e.g. at subscriber network 101 or server 102) and knowledge of the prime numbers as a private RSA key (e.g., as part of database 115 or memory 107 of the device 103 or server 102) to decrypt the biometric signatures. Upon decryption of the biometric signatures (e.g., at device 103 or server 102), the provided biometric signature may be compared with the registered biometric signature to provide access to or launch applications of the user environment 108, as described in further detail below. In addition, the private RSA keys may be periodically changed to change the working public RSA keys over time or as the biometric signatures pass through system 100.

The device 103 may include a display 109 configured to present or display the user environment 113. The devices 103*a-e* may each include the same or a different display 109 or environment 113. The display 109 may include a computer display, support user interfaces, and/or communicate within the system 100. The display 109 may include any output device for presentation or receipt of information in visual or tactile form. Examples of a display may include, without limitation, cathode ray tube display, light-emitting diode display, electroluminescent display, touchscreen, electronic paper, plasma display panel, liquid crystal display, high-performance addressing display, thin-film transistor display, organic light-emitting diode display, surface-conduction electron-emitter display, laser TV, carbon nanotubes, quantum dot display, interferometric modulator display, and the like.

Transceiver 111 may communicatively connect the devices of system 100, for example, using any type of wired or wireless network connection (e.g., connection 117). The wireless network may utilize a wireless transmitter (e.g., cellular, radiofrequency (RF) or Wi-Fi transmitter) of transceiver 111. Transceiver 111 may be configured to communicatively connect any or all of subscriber network 101, server 102, and devices 103*a-e*. Transceiver 111 may be used for digital or analog signal transfers. For instance, transceiver 111 may include any antenna technology including cellular, radiofrequency (RF), near field communication (NFC), Bluetooth®, Wi-Fi, or the like. Transceiver 111 may include any technology that implements a wireless exchange of biometric signatures by converting propagating electromagnetic waves to and from conducted electrical signals. Transceiver 111 may include any technology that is used to exchange biometric signatures wirelessly using radio waves over a radio range or network that enables communication. The transceiver 111 may also include a location determination technology that enables the determination of location information (e.g., a current geographic position) of any of devices 103*a-e*. Examples of location determination technology may include, without limitation, global positioning systems (GPS), indoor positioning system, local positioning system, and mobile phone tracking. The transceiver 111 may be configured to provide a current geographic position of any of devices 103*a-e*.

Any portion of system 100 (e.g., server 102 and devices 103a-e) may include a computing system and/or device that includes a processor 105 and a memory 107. Computing systems and/or devices generally include computer-executable instructions, where the instructions may be executable by one or more devices such as those listed below. Computer-executable instructions may be compiled or interpreted from computer programs created using a variety of programming languages and/or technologies, including, without limitation, and either alone or in combination, Java™, C, C++, Visual Basic, Java Script, Perl, etc. The system 100 and server 102, devices 103a-e, and database 115 may take many different forms and include multiple and/or alternate components and facilities, as illustrated in the Figures further described below. While exemplary systems, devices, modules, and sub-modules are shown in the Figures, the exemplary components illustrated in the Figures are not intended to be limiting. Indeed, additional or alternative components and/or implementations may be used, and thus the above communication operation examples should not be construed as limiting.

In general, computing systems and/or devices (e.g., server 102 and devices 103a-e) may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing systems and/or devices include, without limitation, mobile devices (e.g., devices 103a-d), cellular phones (e.g., devices 103a-c), smart-phones (e.g., devices a-c), super-phones, tablet computers (e.g., device 103b), next generation portable devices, mobile printers, handheld computers, notebooks (e.g., device 103d), laptops, desktops, computer workstations (e.g., device 103e), a server (e.g., server 102), secure voice communication equipment, networking hardware, or any other computing system and/or device.

Further, processors such as processor 105 receives instructions from memories such as memory 107 or database 115 and executes the instructions, thereby performing one or more processes, including one or more of the processes described herein. Such instructions and biometric signatures may be stored and transmitted using a variety of computer-readable mediums (e.g., memory 107 or database 115). Processors such as processor 105 may include processes comprised from any hardware, software, or combination of hardware or software that carries out instructions of a computer programs by performing logical and arithmetical calculations, such as adding or subtracting two or more numbers, comparing numbers, or jumping to a different part of the instructions. For example, the processor 105 may be any one of, but not limited to single, dual, triple, or quad core processors (on one single chip), graphics processing units, visual processing units, and virtual processors.

A memory such as memory 107 or database 115 may include, in general, any computer-readable medium (also referred to as a processor-readable medium) that may include any non-transitory (e.g., tangible) medium that participates in providing biometric signatures or instructions that may be read by a computer (e.g., by the processors 105 of the server 102 and devices 103a-e). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The server 102 and devices 103a-e may include processor 105 that is configured to perform operations with respect to the biometric signatures, for example store biometric signatures as part of memory 107 or database 115. The server 102, device 103, and devices 103a-e may further utilize the processor 105 to transfer, access, compare, and map biometric signatures and launch applications using biometric signatures, as described herein. Further, databases, data repositories or other biometric signatures stores (e.g., memory 107 and database 115) described herein may generally include various kinds of mechanisms for transferring, storing, accessing, and retrieving various kinds of biometric signatures, including a hierarchical database, a set of files in a file system, an application database in a proprietary format, a relational database management system (RDBMS), etc. Each such biometric signatures store may generally be included as part of memory 107 or database 115 (e.g., external to, local to, or remote from the server 102, devices 103a-e, and biometric input device 113) and may be accessed with a computing system and/or device (e.g., server 102 and devices 103a-e) employing a computer operating system such as one of those mentioned above, and/or accessed via a network (e.g., system 100 or subscriber network 101) or connection in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

The computing systems herein may include any electronic hardware that includes a processor 105 and a memory 107 and that is capable of performing the operations discussed herein including the transfer and mapping of biometric signatures as well as providing access to and launching applications using biometric signature. To accomplish the operations herein, the computing systems herein may be configured to utilize communications technologies including, without limitation, any wired or wireless communication technology, such as cellular, near field communication (NFC), Bluetooth®, Wi-Fi, and radiofrequency (RF) technologies. Communication technologies may include any technology configured to exchange electronic information by converting propagating electromagnetic waves to and from conducted electrical signals.

Figure 2:
FIG. 2 illustrates an exemplary access map.

FIG. 2 illustrates an exemplary access map 200. Access map 200 may take many different forms and include multiple and/or alternate components and facilities. While an exemplary access map 200 is shown in FIG. 2, the exemplary components illustrated in FIG. 2 are not intended to be limiting. Indeed, additional or alternative components and/or implementations may be used.

As illustrated in FIG. 2, the access map 200 is configured to map a set of registered biometric signatures of one or a set of user environments 108a-e. The access map 200 may include one or a set of registered biometric signatures that correspond to one or a set of user environments 108. For example, each of biometric signatures 202-210 may be associated with respective users environments 108a-e. The access map 200 may be stored as part of the memory 107 (e.g., of the device 103 or server 102) or database 115. The biometric input device 113 may receive a biometric signature and the processor 105 may match the provided biometric signature with a registered biometric signature of the access map 200. If the biometric signatures match, access may be granted to the user environment 108 of the device 103. If the biometric signatures do not match, access may be denied to the user environment 108 of device 103 and the display 109 may display an "access denied" message or a similar indicator.

With access to the device 103, the user environment 108 may display a user profile associated with the biometric signature of each user. The user profile may include a visual display (e.g., as part of display 109) associated with one or more particular users. The visual display may provide one or a set of applications as part of user environment 108. The access map 200 may be configured to store any number of biometric signatures from any number of users and associate the biometric signatures with any number or type of user profiles.

FIG. 3 illustrates an exemplary application map 300. The application map 300 may take many different forms and include multiple and/or alternate components and facilities. While an exemplary application map 300 is shown in FIG. 3, the exemplary components illustrated in FIG. 3 are not intended to be limiting. Indeed, additional or alternative components and/or implementations may be used.

As illustrated in FIG. 3, the application map 300 is configured to map a set of biometric signatures to one or a set of applications of the user environment 108. The applications may include a general (e.g., operating system tools, calculator, and internet browser), voice or video call, voicemail, e-mail, text messaging, maps, navigation, camera, audio recorder, document reader, finance, music, game, fitness, weather, news, or any other computer application. The application map 300 may be stored as part of the memory 107 (e.g., of the device 103 or server 102) or database 115. The biometric input device 113 may receive a biometric signature and the processor 105 may match the provided biometric signature with the registered biometric signatures of the application map 300. If the biometric signatures match, the user environment 108 may launch the application mapped to the biometric signature. If the biometric signatures do not match, the display 109 of the device 103 may display a "no softkey association" message or a similar indicator.

With matching biometric signatures, the user environment 108, e.g., using the processor 105, may launch an application mapped to one or a combination of biometric signatures. For example, a biometric signature 302 (e.g., a first fingerprint) may launch a general application (e.g., operating system tools, calculator, and internet browser), a biometric signature 304 (e.g., a second fingerprint) may launch a voice or video call application, a biometric signature 306 (e.g., a third fingerprint) may launch a voicemail application, a biometric signature 308 (e.g., a fourth fingerprint) may launch an e-mail application, a biometric signature 310 (e.g., a fifth fingerprint) may launch a text messaging application, a biometric signature 312 (e.g., a sixth fingerprint) may launch a maps and navigation application, a biometric signature 314 (e.g., a seventh fingerprint) may launch a camera application, a biometric signature 316 (e.g., an eighth fingerprint) may launch an audio recorder application, a biometric signature 318 (e.g., a ninth fingerprint) may launch a document reader, and a biometric signature 320 (e.g., a tenth fingerprint) may launch a music application. As a further example, a biometric signature 322 (e.g., a combination of two or more fingerprints) may launch a news application. In addition, a biometric signature 324 (e.g., a combination of two or more types of biometric signatures) may launch a game application. The application map 300 may be configured to store any number or combination of biometric signatures from any number of users and associate the biometric signatures with any number or type of applications.

The device 113, e.g., using the processor 105, may be configured to launch the same application of different user environments 108, for example, using the different biometric signatures. The access map 200 may include a plurality of user environments 108, each user environment 108 having an application map 300. For example, a first biometric signature of a first user environment (e.g., associated with a first user) may be associated with an application and a second biometric signature of a second user environment (e.g., associated with a second user) may be associated with the same application. Thus, first and second users may launch the same application in different user environments 108. As a further example, an e-mail application may be launched by the first and second users, the display 109 may display different user environments 108 providing access to each user's respective e-mail inbox and mailbox folders. For security purposes, the display 109 may prompt for a key, such as a password or a personal identification number (PIN), e.g., if the device 113 is used by two or more users.

The device 113, e.g., using the processor 105, may also be configured to launch applications mapped, e.g., as part of the application map, to one or a set of combinations of a biometric signature and a non-biometric input. The non-biometric input may be associated with any hard-coded button having a fixed function. An exemplary non-biometric input may include a power button configured to turn on or off the device 113, a home button configured to display a home or main screen of the user environment 108, a volume button configured to raise or lower an audio level of the user environment 108, or any hard-coded button configured to populate the user environment 108 with a fixed character or perform a fixed function. For example, a first application may be launched in response to a biometric signature in combination with a first non-biometric input and a second application may be launched in response to the same biometric signature combination with a second non-biometric input. Additionally, a first application may be launched by a first biometric signature in combination with a non-biometric input and a second application may be launched by a second biometric signature in combination with the same non-biometric input. Thus, any combination of non-biometric inputs and biometric signatures may be configured to launch a different application based on the application map.

Figure 4:
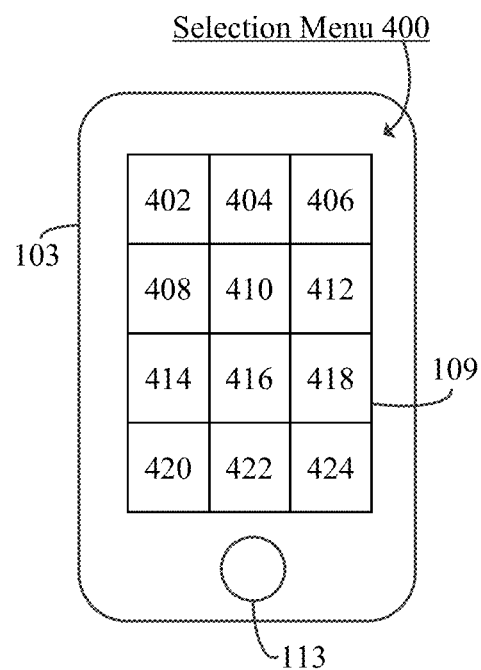
FIG. 4 illustrates an exemplary selection menu.

FIG. 4 illustrates an exemplary selection menu 400. The selection menu 400 may take many different forms and include multiple and/or alternate components and facilities. While an exemplary selection menu 400 is shown in FIG. 4, the exemplary components illustrated in FIG. 4 are not intended to be limiting. Indeed, additional or alternative components and/or implementations may be used.

As illustrated in FIG. 4, after access is provided to the user environment 108 by providing, e.g., a password or biometric signature, the display 109 (e.g., a touchscreen) may display the selection menu 400 having sections 402-424 as part of display 109, each section being mapped to an application of the application map 300, as discussed above. The selection menu 400 may be stored as part of the memory 107 (e.g., of the device 103 or server 102) or database 115 and displayed as part of display 109 of the device 103. The biometric input device 113 may receive a biometric signature, as described above, and, in response, the processor 105 may display the selection menu 400 having sections 402-424 associated with the biometric signature, each section corresponding to an application of the application map 300. With the selection menu 400 displayed, the display 109 (e.g., a touchscreen) may receive a selected section of the selection menu 400 from a user and launch the application mapped to the selected section of the application map 300.

For instance, after biometric input device 113 receives the biometric signature providing access to the user environment 108, the display 109 may present sections 402-424, each section of being associated with an application of the application map 300. The display may receive a selected section, which may be mapped to an application of the application map 300. For example, if section 404 is selected, the application mapped to section 404, such as a general application, may be launched. As a further example, if section 406 is selected, a voice or video call may be launched. Thus, the application map 300 allows for the launch of applications according to selected sections of the display 109.

The display 109 may be configured to display and edit any of the access map 200, application map 300, and selection menu 400. For example, during registration of a biometric input or in response to a received biometric input not matching a registered biometric input (e.g., an incorrect or unregistered biometric signature), the display 109 may be configured to display a mapping of one or more applications to be launched, for example, along with an area having one or more biometric signatures associated with each application. The display 109 may indicate or highlight a particular application lacking a biometric signature or a particular biometric signature lacking an associated user environment 108, application, or section of the display 109.

During registration of the biometric input or at any other time, the order or location of the sections as part of the section menu may be adjustable. For example, the selection menu may be displayed as an editable table configured to receive a location value associated with a particular section of the display 109. The location of any section of the selection menu may be edited by dragging and dropping each section to a desired location as part of the display 109, e.g., a touchscreen. The display 109 may display the updated biometric signatures associations as applications are moved about the display. The display 109 may also indicate or highlight any applications that lack a registered biometric signature or prompt registration of the biometric signature.

Figure 5:
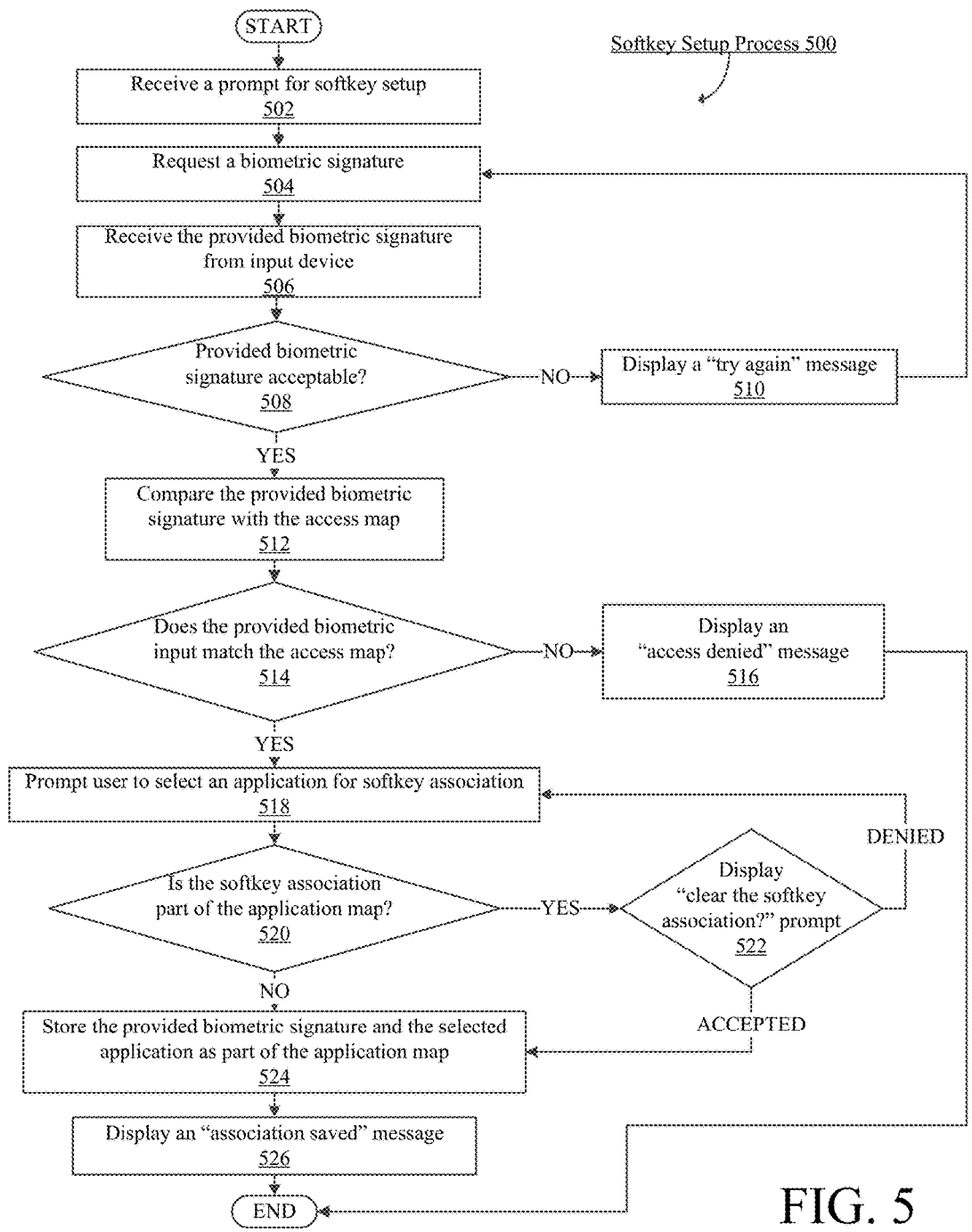
FIG. 5 illustrates an exemplary softkey setup process.

FIG. 5 illustrates an exemplary softkey setup process 500. Process 500 may take many different forms and include multiple and/or alternate components and facilities. While an exemplary process 500 is shown in FIG. 5, the exemplary components illustrated in FIG. 5 are not intended to be limiting. Indeed, additional or alternative components and/ or implementations may be used.

At block 502, the device 103 may receive a prompt for a softkey setup by a user. For example, the prompt may include any hardware and/or software interaction with the device 103 indicating that the user is ready to access the device 103 or launch an application of the user environment 108.

At block 504, the device 103 may request (e.g., using the display 109) a biometric signature from the user.

At block 506, the device 103 may receive the biometric signature (e.g., fingerprint) from the biometric input device 113.

At decision point 508, the processor 105 may determine if the biometric signature is acceptable (e.g., based on the quality threshold), as described above.

At block 510, the display 109 may display a "try again" message if the biometric signature is rejected and restart at block 504. The display 109 may also provide the reason why the biometric signature was rejected, e.g., that the quality was too low, as well as a recommendation regarding how to fix the issue (e.g., screen cleaning needed).

At block 512, the processor 105 may compare the provided biometric signature with the registered biometric signatures of the access map 200.

At decision point 514, the processor 105 may determine if the provided biometric signature matches at least one registered biometric access signature of the access map. For example, the processor 105, in addition to determining whether the biometric signature is acceptable based on the quality threshold, may determine whether the just-provided biometric signature matches that of a biometric signature already registered using the softkey setup process shown in FIG. 5 (i.e., which is already being used to activate an application).

At block 516, the display 109 may display an "access denied" message if the provided biometric signature does not match at least one registered biometric access signature.

At block 518, the user environment 108 (e.g., using the display 109) may prompt the user to select an application for softkey association if the provided biometric signature matches at least one registered biometric access signature.

At block 520, the processor 105 may determine if the softkey association (e.g., the provided biometric signature and the selected application) are part of the application map. If the softkey association is part of the application map, this may indicate that the provided biometric signature has been previously associated with an application or that the selected application already been previously associated with a biometric signature. If the softkey association is not part of the application map, this may indicate a new or currently unused softkey association.

At decision point 522, the display 109 may display a prompt to whether to clear the softkey association if the softkey is already part of the application map, for example, by displaying a "clear the softkey association?" prompt and options to accept or decline the clearing of the softkey association. For example, if the prompt from the display 109 is accepted, the previous softkey is cleared and the selected softkey association is stored as part of the application map. If the prompt from the display 109 is declined, the process may restart at block 518 by re-prompting the user to select another application for softkey association.

At block 524, the user environment 108 (e.g., using the processor 105) may store the provided biometric signature and the selected application as part of the application map 300 and/or the selection menu 400.

At block 526, the user environment 108 (e.g., using the display 109) may display an "association saved" message. After block 526, the process 500 ends.

Figure 6:
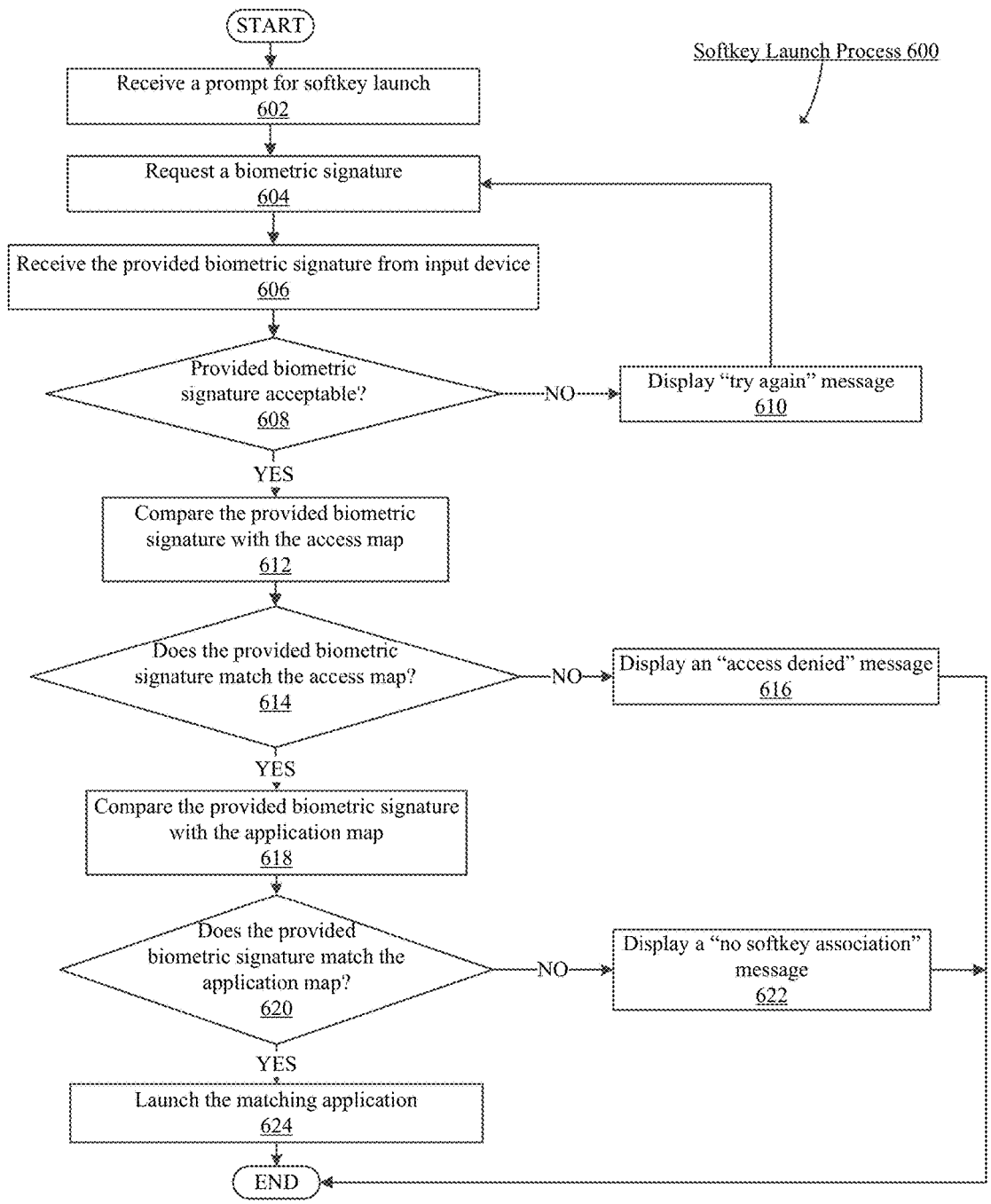
FIG. 6 illustrates an exemplary softkey launch process.

FIG. 6 illustrates an exemplary softkey launch process 600. Process 600 may take many different forms and include multiple and/or alternate components and facilities. While an exemplary process 600 is shown in FIG. 6, the exemplary components illustrated in FIG. 6 are not intended to be limiting. Indeed, additional or alternative components and/or implementations may be used.

At block 602, the device 103 may receive a prompt for softkey setup by a user, as described with respect to process 500.

At block 604, the device 103 may request a biometric signature from the user.

At block 606, the device 103 may receive the biometric signature (e.g., fingerprint) from the biometric input device 113.

At decision point 608, the processor 105 may determine if the biometric signature is acceptable (e.g., based on the quality threshold), as described above.

At block 610, the display 109 may display a "try again" message if the biometric signature is rejected and restart at block 604.

At block 612, the processor 105 may compare the provided biometric signature with the registered biometric signatures of the access map 200 if the provided biometric signature is acceptable.

At decision point 614, the processor 105 may determine if the provided biometric signature matches at least one registered biometric access signature of the access map.

At block 616, the display 109 may display an "access denied" message if the provided biometric signature does not match at least one registered biometric access signature.

At block 618, the processor 105 may compare the provided biometric signature with the registered biometric signatures of the application map 300 if the provided biometric signature matches at least one registered biometric access signature.

At decision point 620, the processor 105 may determine if the provided biometric signature matches at least one registered biometric application signature of the application map.

At block 622, the display 109 may display a "no softkey association" message if the provided biometric signature does not match at least one registered biometric application signature.

At block 624, the user environment 108 may launch the matching application as part of the display 109 if the provided biometric signature matches at least one registered biometric application signature. After block 624, the process 600 ends.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing system, comprising:
   a display;
   a biometric input device;
   a processor and a memory having a user environment communicatively connected to the processor, the processor including a microprocessor and being configured to:
   receive, with the biometric input device, a first biometric signature and a second biometric signature;
   map the first biometric signature to a first application of the user environment and corresponding to a first section of the display and the second biometric signature to a second application of the user environment and corresponding to a second section of the display; and
   automatically launch at least one of the first and second applications using a respective one of the mapped first and second biometric signatures and in response to at least the corresponding one of the first and second sections of the display being selected by the respective one of the mapped first and second biometric signatures.

2. The system of claim 1, the processor further being configured to: evaluate the first and second biometric signature relative to a quality threshold including at least one of an average pixel darkness, a minimum resolution, and a minimum image detail.

3. The system of claim 1, wherein the first and second biometric signatures are part of an access map as part of a database remote from the processor, wherein the first biometric signature is of a first user and the second biometric signature is of a second user.

4. The system of claim 1, wherein the first and second biometric signatures are part of an application map as part of a database remote from the processor, the application map including at least the first and second applications.

5. The system of claim 4, the processor further being configured to:
generate a selection menu based on the application map; and
present the selection menu as part of the display.

6. The system of claim 1, the processor further being configured to:
compare the first and second biometric signatures to an access map;
provide access to the user environment if at least one of the first and second biometric signatures are part of the access map; and
deny access to the user environment if the first and second are not part of the access map.

7. The system of claim 1, the processor further being configured to:
compare the first and second biometric signatures to an application map to determine if at least one of the first or second biometric signatures match a previous association of the application map;
register the first and second biometric signatures as part of the application map if the first and second biometric signatures do not match the application map;
generate a first prompt to clear the previous association if at least one of the first and second biometric signatures matches the application map;
clear the matching previous association if the first prompt is accepted; and
generate a second prompt to select a third application if the first prompt is denied.

8. A non-transitory computer-readable medium tangibly embodying computer-executable instructions of a user environment being executable by a microprocessor of a computing device to provide operations comprising:
receive, by way of a biometric input device, a first biometric signature and a second biometric signature;
map the first biometric signature with a first application of the user environment and corresponding to a first section of a display and the second biometric signature with a second application of the user environment and corresponding to a second section of the display; and
automatically launch at least one of the first and second applications using a respective one of the mapped first and second biometric signatures and in response to at least the corresponding one of the first and second sections of the display being selected by the respective one of the mapped first and second biometric signatures.

9. The medium of claim 8, the operations further comprising: evaluate the first and second biometric signatures relative to a quality threshold including at least one of an average pixel darkness, a minimum resolution, and a minimum image detail.

10. The medium of claim 8, wherein the first and second biometric signatures are part of an access map as part of a database remote from the processor, wherein the first biometric signature is of a first user and the second biometric signature is of a second user.

11. The medium of claim 8, wherein the first and second biometric signatures are part of an application map as part of a database remote from the processor, the application map including the first and second applications.

12. The medium of claim 11, the operations further comprising:
generate a selection menu based on the application map; and
present the selection menu as part of a display.

13. The medium of claim 8, the operations further comprising:
compare the first and second biometric signatures to an access map;
provide access to the user environment if at least one of the first and second biometric signatures are part of the access map; and
deny access to the user environment if the first and second are not part of the access map.

14. The medium of claim 8, the operations further comprising:
compare the first and second biometric signatures to an application map to determine if at least one of the first or second biometric signatures match a previous association of the application map;
register the first and second biometric signatures as part of the application map if the first and second biometric signatures do not match the application map;
generate a first prompt to clear the previous association if at least one of the first and second biometric signatures matches the application map;
clear the matching previous association if the first prompt is accepted; and
generate a second prompt to select a third application if the first prompt is denied.

15. A method comprising:
receiving, by way of a biometric input device, a first biometric signature and a second biometric signature;
mapping the first biometric signature with a first application of a user environment and corresponding to a first section of a display and the second biometric signature with a second application of the user environment and corresponding to a second section of the display;
automatically launching at least one of the first and second applications using a respective one of the mapped first and second biometric signatures and in response to at least the corresponding one of the first and second sections of the display being selected by the respective one of the mapped first and second biometric signatures; and displaying the launched application.

16. The method of claim 15, the method further comprising: evaluating the first and second biometric signature relative to a quality threshold including at least one of an average pixel darkness, a minimum resolution, or a minimum image detail.

17. The method of claim 15, wherein at least one of the first and second biometric signatures are part of an access map as part of a database, wherein the first biometric signature is of a first user and the second biometric signature is of a second user.

18. The method of claim 15, wherein the first and second biometric signatures are part of an application map as part of a database, the application map including at least the first and second applications.

19. The method of claim 18, the method further comprising:
generating a selection menu based on the application map; and
presenting the selection menu as part of a display.

20. The method of claim 15, the method further comprising:
- comparing by way of the processor the first and second biometric signatures to an application map to determine if at least one of the first or second biometric signatures match a previous association of the application map;
- registering the first and second biometric signatures as part of the application map if the first and second biometric signatures do not match the application map;
- generating by way of the processor a first prompt to clear the previous association if at least one of the first and second biometric signatures matches the application map;
- clearing the matching previous association if the first prompt is accepted; and
- generating by way of the processor a second prompt to select a third application if the first prompt is denied.

* * * * *